(12) United States Patent  (10) Patent No.: US 9,198,143 B2
Wang et al.                     (45) Date of Patent:    Nov. 24, 2015

(54) METHOD AND APPARATUS FOR IMPROVED MANAGEMENT OF SERVICE-IMPACTING EVENTS

(75) Inventors: Jin Wang, Lisle, IL (US); Yang Yang, Morris Plains, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 612 days.

(21) Appl. No.: 13/436,148

(22) Filed: Mar. 30, 2012

(65) Prior Publication Data

US 2013/0260815 A1    Oct. 3, 2013

(51) Int. Cl.
| | |
|---|---|
| H04B 7/00 | (2006.01) |
| H04B 1/00 | (2006.01) |
| H04W 52/34 | (2009.01) |
| H04L 12/24 | (2006.01) |
| H04W 52/02 | (2009.01) |
| H04W 52/14 | (2009.01) |

(52) U.S. Cl.
CPC ......... *H04W 52/343* (2013.01); *H04L 41/0654* (2013.01); *H04W 52/0206* (2013.01); *H04W 52/143* (2013.01); *Y02B 60/50* (2013.01)

(58) Field of Classification Search
CPC .......................... H04W 52/343; H04W 52/143
USPC ........................................ 455/522, 69, 127.1
See application file for complete search history.

(56) References Cited

U.S. PATENT DOCUMENTS

| | | | |
|---|---|---|---|
| 8,311,061 B2* | 11/2012 | Yu et al. ........................ | 370/474 |
| 8,402,334 B2* | 3/2013 | Yu et al. ........................ | 714/749 |
| 8,423,072 B2* | 4/2013 | Whinnett ...................... | 455/522 |
| 8,437,795 B2* | 5/2013 | Kwon et al. .................. | 455/522 |
| 8,463,312 B2* | 6/2013 | Whinnett ...................... | 455/522 |
| 8,554,200 B2* | 10/2013 | Ribeiro et al. ............... | 455/424 |
| 2008/0064361 A1 | 3/2008 | Bjork et al. | |
| 2009/0264077 A1* | 10/2009 | Damnjanovic .............. | 455/63.1 |
| 2010/0009694 A1 | 1/2010 | Fischer | |
| 2010/0093364 A1* | 4/2010 | Ribeiro et al. ............ | 455/452.2 |
| 2010/0234061 A1 | 9/2010 | Khandekar | |
| 2011/0076998 A1 | 3/2011 | Proctor | |
| 2012/0106370 A1* | 5/2012 | Radulescu et al. ........... | 370/252 |
| 2012/0163438 A1* | 6/2012 | Fujii et al. ..................... | 375/224 |
| 2013/0137478 A1* | 5/2013 | Szufarska et al. ........... | 455/522 |

OTHER PUBLICATIONS

3rd Generation Partnership Project; Technical Specification Group Services and System Aspects; Tele. Mgmt; Self-Organizing Netwrk V10.0.0 Mar. 28, 2011, pp. 1-021, XP050476451.
PCT/US2013/033639, Notification of Transmittal of the Int'l Serach Report and the Written Opinion of the Int'l Searching Authority, or the declaration dated Jun. 27, 2013.

* cited by examiner

*Primary Examiner* — Tilahun B Gesesse
(74) *Attorney, Agent, or Firm* — Harness, Dickey & Pierce, P.L.C.

(57) ABSTRACT

Various methods and devices are provided to address the need for improved management of service-impacting events. In one method, network equipment determines (201) for a network node that a traffic overload situation is present or that a service-impacting event is imminent or has occurred to establish an operating condition. It then reduces (202) transmit power to a lower level when the operating condition has been established. The network equipment then determines (203) for the network node that the operating condition no longer applies because the traffic overload situation is no longer present or an event subsequent to the service-impacting event has occurred. It then restores (204) transmit power when this operating condition no longer applies.

10 Claims, 4 Drawing Sheets

METHOD AND APPARATUS FOR IMPROVED MANAGEMENT OF SERVICE-IMPACTING EVENTS

FIELD OF THE INVENTION

The present invention relates generally to communications and, in particular, to managing transmit power during service-impacting events in wireless communication systems.

BACKGROUND OF THE INVENTION

This section introduces aspects that may help facilitate a better understanding of the inventions. Accordingly, the statements of this section are to be read in this light and are not to be understood as admissions about what is prior art or what is not prior art.

Most mobile networks presently operate according to $2^{nd}$ Generation (2G) or $3^{rd}$ Generation (3G) standards to provide voice and data services. The trend for mobile networks is to evolve towards $4^{th}$ Generation (4G) technologies. One project within the 3rd Generation Partnership Project (3GPP, 3GPP2) is the Long Term Evolution (LTE), which is a 4G technology intended to provide data rates of 100 mbps or more. The network architecture defined by this project is referred to as the Evolved Packet System (EPS). The EPS architecture comprehends e-UTRAN (evolved-UMTS Terrestrial Radio Access Network) on the radio access side and EPC (Evolved Packet Core) on the core side.

e-UTRAN is the air interface of the LTE network, and comprises a plurality of base stations that are referred to as Enhanced NodeBs (eNodeBs or eNBs). NodeB is a term used in UMTS to refer to a base station or cell site that interfaces a mobile device with a core network (similar to a base transceiver station (BTS) in a GSM network). A base station or network node includes antennas that communicate with mobile devices that are within a certain range. The coverage area surrounding the network node/base station is referred to as a "cell". An eNodeB is comprised of multiple cells or sectors and is an enhanced base station that performs tasks similar to a nodeB in communicating with mobile devices.

LTE standards, such as 3GPP Technical Specification (TS) 36.331, allow an eNodeB to take itself out of service and suspend wireless service within its cell. This is typically referred to as "cell-barring". There are a variety of situations where an eNodeB implements cell-barring. For example, an eNodeB may be scheduled for maintenance, a software update, a hardware update, etc. Also, an eNodeB may dynamically detect problems, such as connectivity between the eNodeB and a Mobility Management Entity (MME). When an eNodeB implements cell-barring, the eNodeB announces its unavailability in a System Information Message to mobile devices (or user equipment (UEs)) within its cells. The mobile devices that receive the System Information Message will exclude the barred cell as a candidate for cell selection.

However, edge UEs served by cells neighboring the barred eNB may continue to make handover (HO) attempts to the barred cell because these connected UEs may still see that the barred cell has a better signal (RSRP) than their current serving cell does. The HO requests are rejected, but the number of such attempts may exceed 40,000 per day. Clearly, wasted signaling and processing, such as in this cell-barring situation, is not desireable. Thus, new solutions and techniques that are able to address one or more of these issues would meet a need and advance wireless communications generally.

Figure 1:
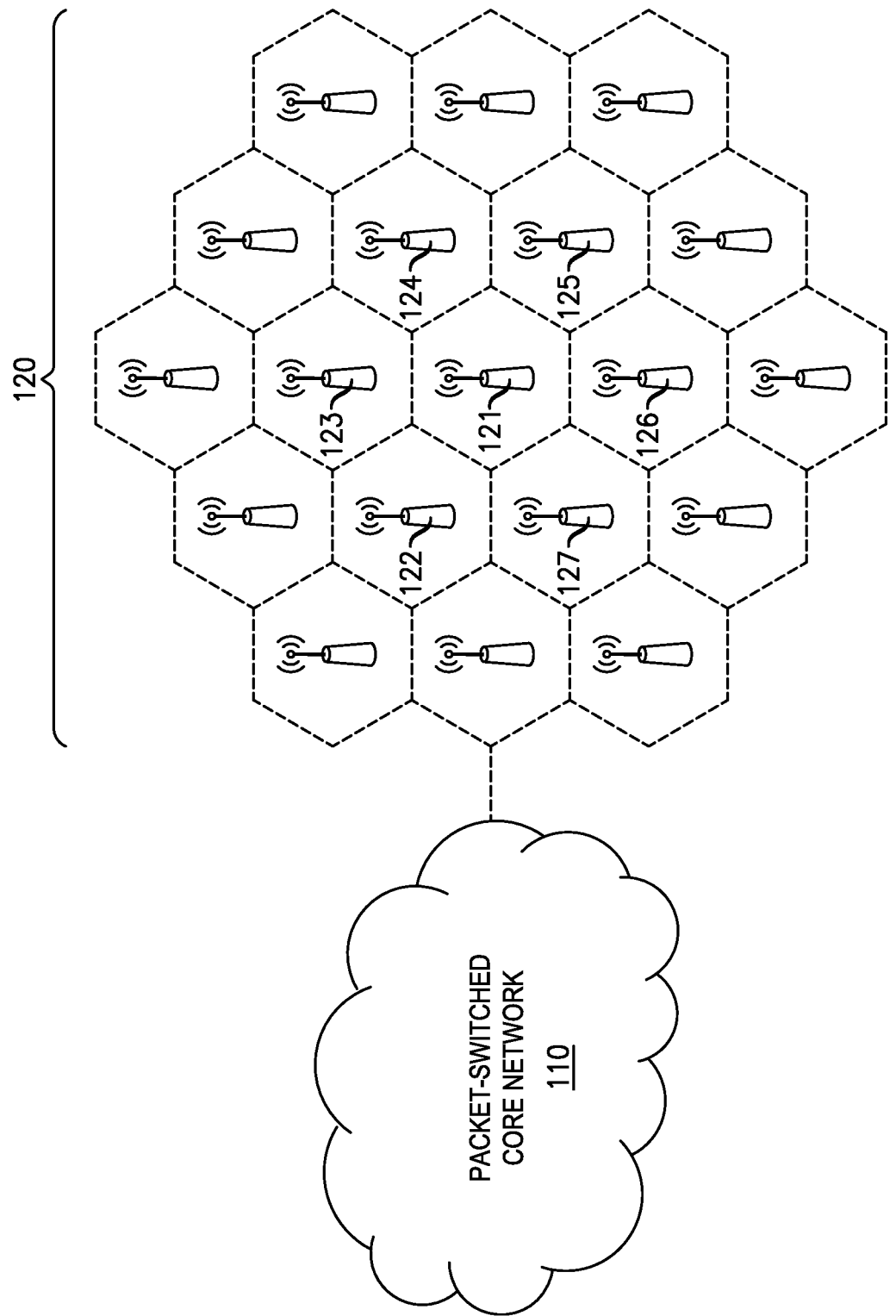
FIG. 1 is a block diagram depiction of a communication system in accordance with a various embodiments of the present invention.

Specific embodiments of the present invention are disclosed below with reference to FIGS. 1-4. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the logic flow diagrams above are described and shown with reference to specific steps performed in a specific order, some of these steps may be omitted or some of these steps may be combined, sub-divided, or reordered without departing from the scope of the claims. Thus, unless specifically indicated, the order and grouping of steps is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

SUMMARY OF THE INVENTION

Various methods and devices are provided to address the need for improved management of service-impacting events. In a first method, it is determined for a network node that a service-impacting event has occurred or is imminent to establish a reduced power condition. The network node then reduces transmit power to a lower level when this reduced power condition has been established. It is then determined for the network node that an event subsequent to the service-impacting event has occurred and that the reduced power condition no longer applies. The network node then restores transmit power when this reduced power condition no longer applies. An article of manufacture is also provided, the article comprising a processor-readable storage medium storing one or more software programs which when executed by one or more processors performs the steps of this method.

Many embodiments are provided in which the method above is modified. For example, in many embodiments, determining for the network node that a service-impacting event has occurred or is imminent involves detecting a link outage between the network node and a mobility management entity or detecting a link outage between the network node and a neighboring network node. In many embodiments, determining for the network node that an event subsequent to the service-impacting event has occurred and that the reduced power condition no longer applies involves detecting a link recovery between the network node and a mobility management entity or detecting a link recovery between the network node and a neighbor network node.

Also, in many embodiments, reducing transmit power to a lower level when the reduced power condition has been established involves reducing Reference Signal Power to a lower, configurable level, and in some embodiments, an indication that this level is changing is broadcast. Depending on the embodiment, reducing Reference Signal Power to a lower, configurable level may involve reducing Reference Signal Power to at least one intermediate, pre-configured level for a pre-configured duration before further reducing the Reference Signal Power. In such embodiments, each of the at least one intermediate levels may have a corresponding configurable duration.

In a second method, it is determined for a network node that a traffic overload condition is present. The network node then reduces transmit power to a lower level when this traffic overload condition is present. It is then determined for the network node that the traffic overload condition is no longer present. The network node then restores transmit power when this traffic overload condition is no longer present. An article of manufacture is also provided, the article comprising a processor-readable storage medium storing one or more software programs which when executed by one or more processors performs the steps of this method.

Many embodiments are provided in which this second method is modified. For example, in many embodiments, it is indicated to at least one neighbor network node that a traffic overload condition is present for the network node. Also, in many embodiments, reducing transmit power to a lower level when the traffic overload condition is present involves reducing Reference Signal Power to a lower, configurable level, and in some embodiments, an indication that this level is changing is broadcast. Depending on the embodiment, reducing Reference Signal Power to a lower, configurable level may involve reducing Reference Signal Power to at least one intermediate, pre-configured level for a pre-configured duration before further reducing the Reference Signal Power. In such embodiments, each of the at least one intermediate levels may have a corresponding configurable duration.

A first network equipment apparatus is also provided. The network equipment is configured to communicate with other equipment in the system and is operative to determine for a network node that a service-impacting event has occurred or is imminent to establish a reduced power condition, wherein the network equipment comprises the network node, is operative to reduce transmit power to a lower level when the reduced power condition has been established, is operative to determine for the network node that an event subsequent to the service-impacting event has occurred and that the reduced power condition no longer applies, and is operative to restore transmit power by the network node when the reduced power condition no longer applies. Many embodiments are provided in which this network equipment is modified. Examples of such embodiments can be found described above with respect to the first method.

A second network equipment apparatus is also provided. The network equipment is configured to communicate with other equipment in the system and is operative to determine for a network node that a traffic overload condition is present, wherein the network equipment comprises the network node, is operative to reduce transmit power to a lower level when the traffic overload condition is present, is operative to determine for the network node that the traffic overload condition is no longer present, and is operative to restore transmit power by the network node when the traffic overload condition is no longer present. Many embodiments are provided in which this network equipment is modified. Examples of such embodiments can be found described above with respect to the second method.

DETAILED DESCRIPTION OF EMBODIMENTS

Figure 2:
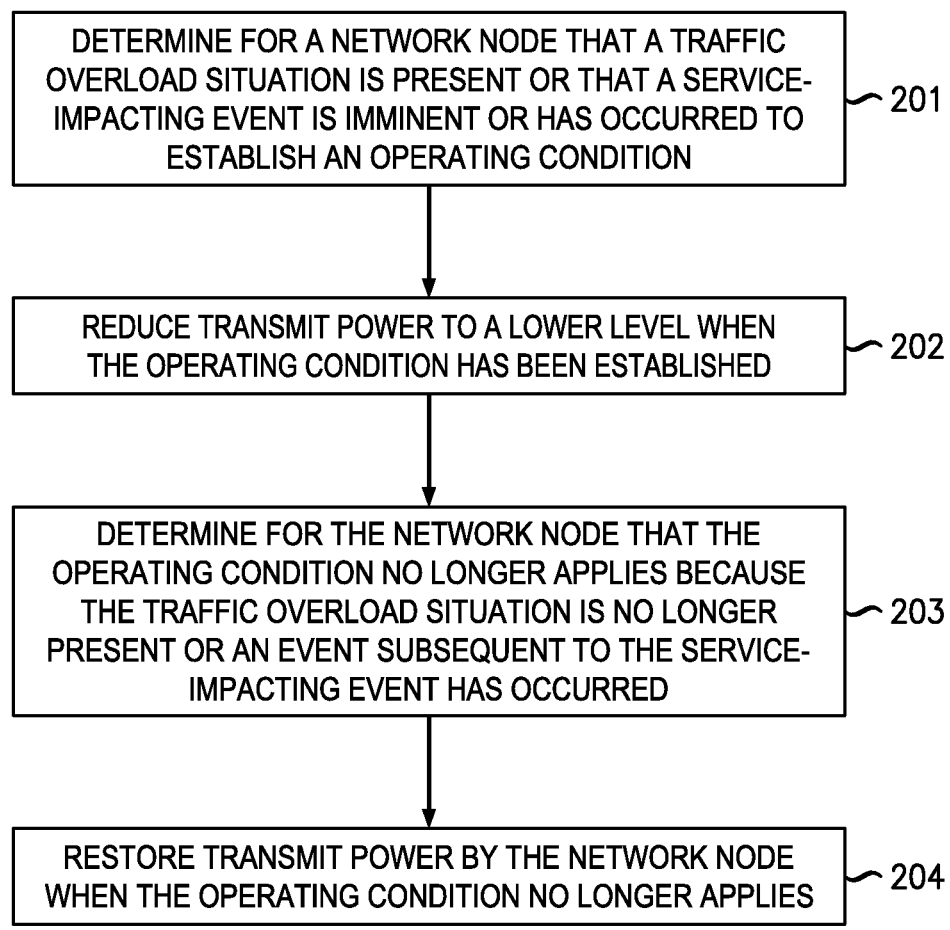
FIG. 2 is a logic flow diagram of functionality performed by network equipment in accordance with various embodiments of the present invention.

The present invention can be more fully understood with reference to FIGS. 1 and 2. FIG. 1 illustrates a mobile network 100 in accordance with a various embodiments of the present invention. Mobile network 100 includes a packet-switched core network 110 connected to a plurality of network nodes 120, which include individual network nodes 121-127. Mobile network 100 may comprise an LTE network, for example, where packet-switched core network 110 comprises an EPC network and network nodes 120 comprise eNodeBs, or may comprise any other type of mobile network having a packet-switched core. Each of network nodes 120 forms one or more cells within mobile network 100. The cell represents a coverage area where mobile devices (not shown) are able to exchange wireless signals with a network node. The cells in FIG. 1 are represented by hexagons surrounding each of the network nodes 120.

Diagram 200 of FIG. 2 is a logic flow diagram of functionality performed by network equipment in accordance with various embodiments of the present invention. Depending on the embodiment, the network equipment may take various forms. For example, the network equipment may comprise a network node, part of a network node, distributed portions of multiple network nodes, and/or distributed portions of one or more network nodes and one or more other network devices (such as those usually considered part of a core network).

In the method depicted in diagram 200, network equipment determines (201) for a network node that a traffic overload situation is present or that a service-impacting event is imminent or has occurred to establish an operating condition. It then reduces (202) transmit power to a lower level when the operating condition has been established. The network equipment then determines (203) for the network node that the operating condition no longer applies because the traffic overload situation is no longer present or an event subsequent to the service-impacting event has occurred. It then restores (204) transmit power when this operating condition no longer applies.

Many embodiments are provided herein in which the method and logic flow above may be modified. For example, in many embodiments, determining that a service-impacting event has occurred or is imminent may involve detecting a link outage between the network node and either a mobility management entity or a neighboring network node. Likewise, determining that the operating condition no longer applies would involve detecting a corresponding link recovery. Also, in many embodiments, determining that a service-impacting event has occurred or is imminent may involve receiving an indication that the network node is about to experience an outage (whether planned or otherwise).

Figure 3:
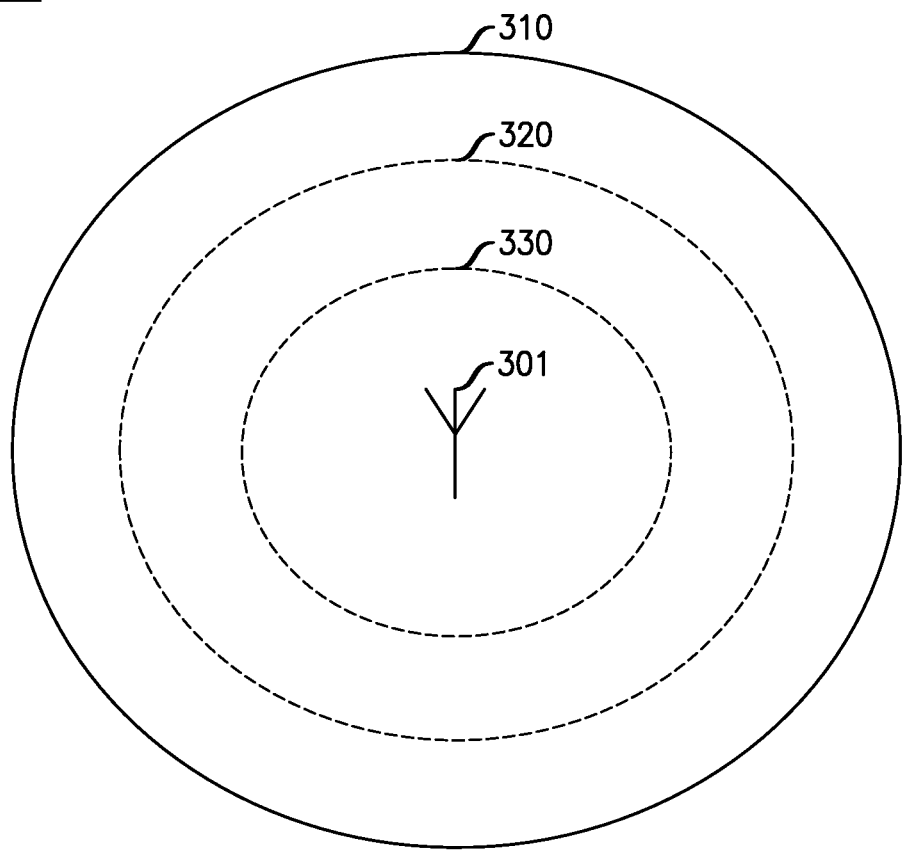
FIG. 3 is a block diagram depiction of cell and its coverage areas in accordance with a certain embodiments of the present invention.
Figure 4:
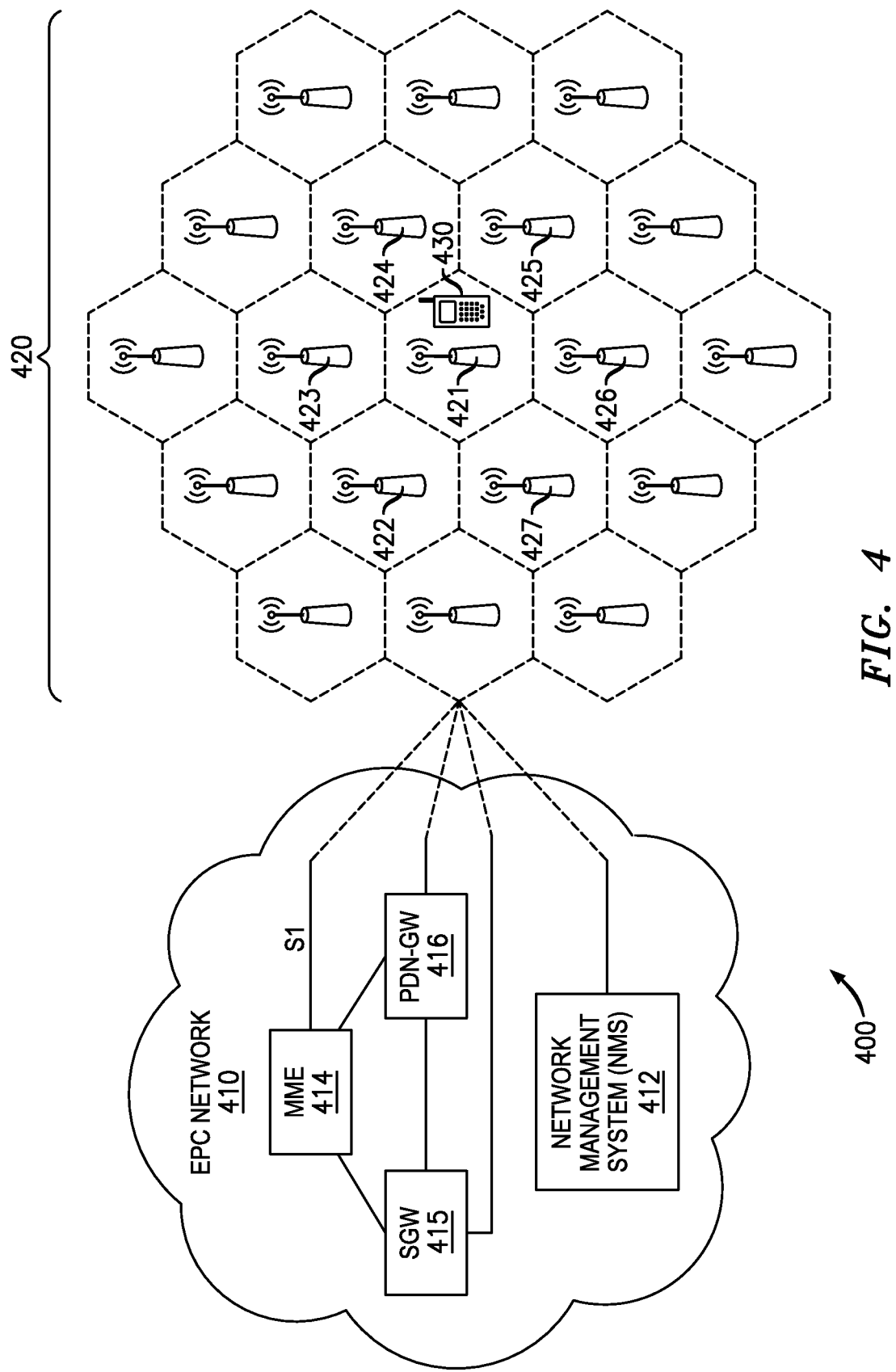
FIG. 4 is a block diagram depiction of an LTE network in accordance with a certain embodiments of the present invention.

To provide a greater degree of detail in making and using various aspects of the present invention, a description of our approach to improved management of service-impacting events and a description of certain, quite specific, embodiments follows for the sake of example. FIGS. 3 and 4 are referenced in an attempt to illustrate some specific embodiments of the present invention.

FIG. 4 illustrates an LTE network 400 in accordance with a certain embodiments of the present invention. LTE network 400 is just one example of the mobile network 100 shown in FIG. 1. LTE network 400 includes an Evolved Packet Core (EPC) network 410 that is connected to a plurality of eNodeBs 420. LTE network 400 is able to provide 4G service to customers. One or more end users have subscribed to 4G service through LTE network 400. The end users have mobile devices (referred to as User Equipment (UE)) that are equipped to receive 4G services from LTE network 400. UE 430 is illustrated in FIG. 4 as an example.

EPC network 410 includes a network management system 412, a Mobility Management Entity (MME) 414, a serving gateway (SGW) 415, and a Packet Data Network Gateway (PDN-GW) 416. In this example, network management system 412 may comprise an Operation, Administration, and Maintenance (OAM) system, which is a group of management functions that provide system or network fault indication, network configuration (including the neighbor eNodeBs lookup table), performance monitoring, security management, diagnostic functions, etc. An OAM system may also be referred to as an Operations Support System (OSS) and/or a Business Support System (BSS). MME 414 is responsible for tracking the location of UEs in LTE network 400 so that calls may be routed to the UEs, among other functionalities. SGW 415 routes and forwards user data packets between UEs in LTE network 400 and other 3GPP technology networks (3G or 2G networks). PDN-GW 416 provides bearer connectivity from UEs in the LTE network 400 to external packet data networks by being the point of entry or exit.

Assume that communication between MME 414 and eNodeB 421 over the S1 interface becomes interrupted. When the S1 link outage is detected, the eNB 421 reduces Reference Signal Power (and thus total transmit power) to an operator-configurable low level such that the cell radius equivalent would change to zero (or nearly zero). Reference Signal Power is a standard-defined value, which is the basis for UE measurements for HO and other purposes. This parameter is broadcast by an LTE cell to UEs via SIB2 in the broadcast message. When Reference Signal Power is changed, total transmit power is changed proportionally.

The transmit power reduction may consist of a single drop in transmit power, or multiple medium-sized drops interleaved with configurable pause(s) in between. The corresponding update in SIB2 that is broadcast to UEs and the update in the cell/modem will be synchronized so that UEs and the cell/modem switch to the new value at the same time. For each drop, the cell/modem may ramp down the transmit power in one or multiple steps, as needed. When the S1 link recovers, the eNB 421 would restore Reference Signal Power to the original value. The transmit power restore may involve a single increase or multiple medium-sized jumps interleaved with configurable pause(s) in between.

This ability to ramp-down/ramp-up transmit power in stages may be used by an operator to better control the potential waves of HOs and re-attachments that the transmit power change may cause. For example, in diagram 300 of FIG. 3, eNB 301 has a wireless coverage area 310 when transmitting at a normal operating level. If it reduces its transmit power to zero or near-zero, then all of the UEs within coverage area 310 will flood neighboring cells with HO requests during the same interval. However, if it first steps its transmit power down to a first level, then only the UEs between coverage areas 310 and 320 will try to HO or make re-attachment to neighboring cells at once. After a period, the transmit power can be reduced to a second level causing the UEs between coverage areas 320 and 330 to make HO or re-attachment to neighboring cells. In this manner, the potential wave of re-attachments can be better controlled by the operator given some knowledge of the traffic characteristics of eNB 301.

Thus, when a service-impacting event such as an S1 link outage or an eNB-to-eNB link outage occurs, the failure may be managed by dynamically reducing transmission power to a very low level such that the effective cell radius (or cell coverage area) becomes zero or nearly zero. It is desirable to do this by utilizing a transmitter standby mode, which thereby avoids shutting down the radios or rebooting the cell modem. When the affected links recover, the cell restores the original value of the transmit power dynamically, without the need to bring up radios or reboot the modem. With the reduction of transmit power, the root cause of inter-cell interference is eliminated while eNB availability metrics are not impacted. In addition, it avoids potential cascading failures in neighbor cells which can occur if, in response to S1 link outage, cells radios are shutdown causing all affected UEs to make re-attachments to neighbor cells all at once.

This approach may also be used for the interval prior to a planned eNB outage. The eNB would reduce Reference Signal Power to a low level (although perhaps not zero) to encourage outgoing HOs to neighbor cells and discourage incoming HOs from neighbor cells. Again, since the traffic from the former can cause overload in neighbor cells, the reduction of Reference Signal Power may involve multiple drops with pauses to smooth out HO and UE re-attachment traffic to the neighbors. The gradual reduction is such that a certain degree of coverage overlapping between this eNB and its neighbor cells is maintained for the HOs. Meanwhile, neighbor eNBs may be notified regarding the beginning of this call draining process and, in response, adjust their power settings to increase their effective coverage. In this way, the coverage hole created by the planned eNB outage can be greatly minimized, thereby improving "eNB availability" metrics.

This approach may also be used when a traffic overload situation is detected. Reference Signal Power may be reduced somewhat resulting in a reduction of the overload cell(s) coverage. Incoming HO requests to the overloaded cell will be reduced since edge UEs served by neighbor cells will no longer see RSRP/RSRQ of the overloaded cell to be better than that of the neighbor cell. Also, outgoing HO requests to neighbor cells would be encouraged since edge UEs served by the overloaded cells will see a relatively better RSRP/RSRQ for the neighbor cells. The end result would thereby be a reduced traffic load. When the overload situation is over, the Reference Signal Power is restored to the original value, thereby restoring the normal coverage area and the traffic load.

The detailed and, at times, very specific description above is provided to effectively enable a person of skill in the art to make, use, and best practice the present invention in view of what is already known in the art. In the examples, specifics are provided for the purpose of illustrating possible embodiments of the present invention and should not be interpreted as restricting or limiting the scope of the broader inventive concepts.

A person of skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

What is claimed is:

1. A method comprising:
   determining for a network node that a service-impacting event has occurred or is imminent to establish a reduced power condition;
   reducing transmit power, by the network node, to a lower level when the reduced power condition has been established;
   determining for the network node that an event subsequent to the service-impacting event has occurred and that the reduced power condition no longer applies;
   restoring the transmit power by the network node when the reduced power condition no longer applies,
   wherein the determining for the network node that a service-impacting event has occurred or is imminent to establish a reduced power condition comprises at least one of:
   detecting a link outage between the network node and a mobility management entity,
   detecting a link outage between the network node and a neighboring network node, and
   receiving an indication that a planned outage is imminent.

2. The method as recited in claim 1, wherein the determining for the network node that an event subsequent to the service-impacting event has occurred and that the reduced power condition no longer applies comprises at least one of:
   detecting a link recovery between the network node and the mobility management entity,
   detecting a link recovery between the network node and the neighbor network node, and
   receiving an indication that the planned outage is over.

3. The method as recited in claim 1, wherein the reducing the transmit power, by the network node, to a lower level when the reduced power condition has been established comprises reducing a Reference Signal Power to a lower, configurable level.

4. The method as recited in claim 3, further comprising broadcasting an indication that the Reference Signal Power level is changing.

5. The method as recited in claim 3, wherein the reducing Reference Signal Power to a lower, configurable level comprises reducing the Reference Signal Power to at least one intermediate, pre-configured level for a pre-configured duration before further reducing the Reference Signal Power, wherein each of the at least one intermediate levels has a corresponding configurable duration.

6. A network equipment of a communication system, the network equipment being configured to communicate with at least one other equipment in the system, by:
   determining for a network node that a service-impacting event has occurred or is imminent to establish a reduced power condition, wherein the network equipment comprises the network node,
   reducing transmit power to a lower level when the reduced power condition has been established,
   determining for the network node that an event subsequent to the service-impacting event has occurred and that the reduced power condition no longer applies, and
   restoring the transmit power by the network node when the reduced power condition no longer applies,
   wherein the network equipment is configured to determine for the network node that the service-impacting event has occurred or is imminent to establish the reduced power condition, by at least one of:
   detecting a link outage between the network node and a mobility management entity,
   detecting a link outage between the network node and a neighboring network node, and
   receiving an indication that a planned outage is imminent.

7. The network equipment as recited in claim 6, wherein the network equipment is configured to determine for the network node that an event subsequent to the service-impacting event has occurred and that the reduced power condition no longer applies, by at least one of:
   detecting a link recovery between the network node and a mobility management entity,
   detecting the link recovery between the network node and the neighbor network node, and
   receiving an indication that a planned outage is over.

8. The network equipment as recited in claim 6, wherein the network equipment is configured to reduce the transmit power to a lower level when the reduced power condition has been established, by reducing a Reference Signal Power to a lower, configurable level.

9. The network equipment as recited in claim 8, further configured to broadcast an indication that the Reference Signal Power level is changing.

10. The network equipment as recited in claim 8, wherein the network equipment is configured to reduce Reference Signal Power to a lower, configurable level by reducing the Reference Signal Power to at least one intermediate, pre-configured level for a pre-configured duration before further reducing the Reference Signal Power, wherein each of the at least one intermediate levels has a corresponding configurable duration.

* * * * *